US010726981B2

(12) United States Patent
Hesampour et al.

(10) Patent No.: US 10,726,981 B2
(45) Date of Patent: Jul. 28, 2020

(54) FUNCTIONALIZED MAGNETIC NANOPARTICLES AND A METHOD FOR PREPARATION THEREOF

(71) Applicant: Kemira Oyj, Helsinki (FI)

(72) Inventors: Mehrdad Hesampour, Helsinki (FI); Lasse Kyllönen, Helsinki (FI); Ari Auvinen, Espoo (FI); Adina Anghelescu-Hakala, Espoo (FI)

(73) Assignee: Kemira Oyj, Helsinki (FI)

( * ) Notice: Subject to any disclaimer, the term of this patent is extended or adjusted under 35 U.S.C. 154(b) by 279 days.

(21) Appl. No.: 15/762,888

(22) PCT Filed: Sep. 21, 2016

(86) PCT No.: PCT/FI2016/050658
§ 371 (c)(1),
(2) Date: Mar. 23, 2018

(87) PCT Pub. No.: WO2017/051075
PCT Pub. Date: Mar. 30, 2017

(65) Prior Publication Data
US 2018/0268972 A1    Sep. 20, 2018

(30) Foreign Application Priority Data
Sep. 23, 2015  (FI) ..................................... 20155680

(51) Int. Cl.
| | | |
|---|---|---|
| *H01F 1/44* | (2006.01) | |
| *H01F 1/00* | (2006.01) | |
| *B22F 1/00* | (2006.01) | |
| *B22F 1/02* | (2006.01) | |
| *C08F 292/00* | (2006.01) | |
| *B01D 61/00* | (2006.01) | |
| *C02F 1/44* | (2006.01) | |
| *B22F 9/28* | (2006.01) | |
| *C08F 120/56* | (2006.01) | |
| *C08F 220/54* | (2006.01) | |
| *C09D 4/00* | (2006.01) | |
| *B82Y 25/00* | (2011.01) | |
| *B82Y 40/00* | (2011.01) | |

(52) U.S. Cl.
CPC ........... *H01F 1/442* (2013.01); *B01D 61/005* (2013.01); *B22F 1/0018* (2013.01); *B22F 1/0022* (2013.01); *B22F 1/0062* (2013.01); *B22F 1/02* (2013.01); *B22F 9/28* (2013.01); *C02F 1/445* (2013.01); *C08F 120/56* (2013.01); *C08F 220/54* (2013.01); *C08F 292/00* (2013.01); *C09D 4/00* (2013.01); *H01F 1/0054* (2013.01); *B01D 2311/2607* (2013.01); *B22F 2301/15* (2013.01); *B22F 2999/00* (2013.01); *B82Y 25/00* (2013.01); *B82Y 40/00* (2013.01); *C02F 2305/08* (2013.01); *C08F 2438/01* (2013.01); *C08F 2438/03* (2013.01); *C22C 2202/02* (2013.01)

(58) Field of Classification Search
CPC ........ H01F 1/0054; H01F 1/442; C02F 1/445; C02F 2305/08; C08F 120/56; C08F 292/00; C08F 2438/01; C08F 2438/03; C08F 220/54; B22F 1/0018; B22F 1/0022; B22F 1/0062; B22F 1/02; B22F 9/28; B22F 2999/00; B22F 2301/15; C09D 4/00; B01D 61/005; B01D 2311/2607; B82Y 40/00; B82Y 25/00; C22C 2202/02
See application file for complete search history.

(56) References Cited

U.S. PATENT DOCUMENTS

| | | |
|---|---|---|
| 2008/0213189 A1 | 9/2008 | Lee et al. |
| 2008/0220531 A1 | 9/2008 | Stayton et al. |
| 2010/0059449 A1 | 3/2010 | Grass et al. |
| 2012/0235075 A1 | 9/2012 | Iftime et al. |
| 2012/0235079 A1 | 9/2012 | Iftime et al. |
| 2013/0112911 A1 | 5/2013 | Mazyar et al. |

FOREIGN PATENT DOCUMENTS

| | | |
|---|---|---|
| EP | 2731114 A1 | 5/2014 |
| WO | 2010043914 A2 | 4/2010 |
| WO | 2011099941 A1 | 8/2011 |
| WO | 2013014538 A2 | 1/2013 |
| WO | 2013192629 A1 | 12/2013 |

OTHER PUBLICATIONS

Finnish Patent and Registration Office, Search Report issued on FI20155680, dated Apr. 15, 2016.
Zeltner, M. et al.: "Stable dispersions of ferromagnetic carbon-coated metal nanoparticles: preparation via surface initiated atom transfer radical polymerization", J. Mater. Chem., vol. 22, 2012, 12064-12071.
Bu, T. et al.: "Adsorption and separation of amyloid beta aggregates using ferromagnetic nanoparticles coated with charged polymer brushes", J. Mater. Chem. B, vol. 3, 2015—3351-3357, first published online Mar. 5, 2015 (J. Mater. Chem. B webpage).

(Continued)

*Primary Examiner* — John Kim
(74) *Attorney, Agent, or Firm* — Berggren LLP

(57) ABSTRACT

The present disclosure relates to a method for manufacturing a covalently functionalized coated magnetic nanoparticle and to said particles and uses thereof. The preparation method includes forming a shell of a hydrophilic polymer coating layer on top of a magnetic metal core coated with a carbon coating. In the method a particle comprising a magnetic metal core coated with a carbon coating is provided. The surface of the particle is subjected to covalent functionalization by generating amino reactive groups via diazonium chemistry and subsequently an irreversible attachment of an atom transfer radical polymerization (ATRP) initiator is carried out on said surface. A hydrophilic polymer layer is formed) by a surface initiated atom transfer radical polymerization (SI-ATRP) reaction with a monomer comprising N-isopropylacrylamide (NIPAM).

7 Claims, 4 Drawing Sheets

(56) References Cited

OTHER PUBLICATIONS

Griffete, N. et al.: "Amino covalent binding approach on iron oxide nanoparticle surface: toward biological applications", Colloids and Surfaces A: Physicochemical and Engineering Aspects, vol. 415, 2012, 98-104.
Yingrak et al.: "Azlactone functionalization of magnetic nanoparticles using ATRP and their bioconjugation", Polymer, vol. 53, No. 1, Nov. 13, 2011, pp. 113-120, XP028349461, ISSN: 0032-3861, DOI: 10.1016/J.POLYMER.2011.11.021 [retrieved on Nov. 19, 2011].

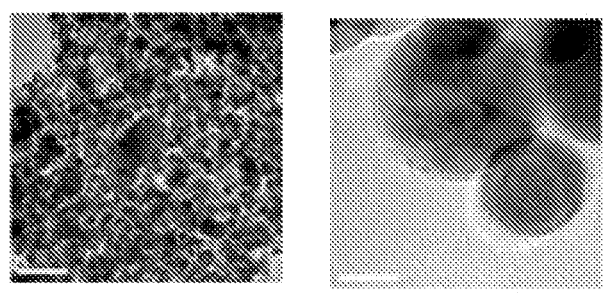
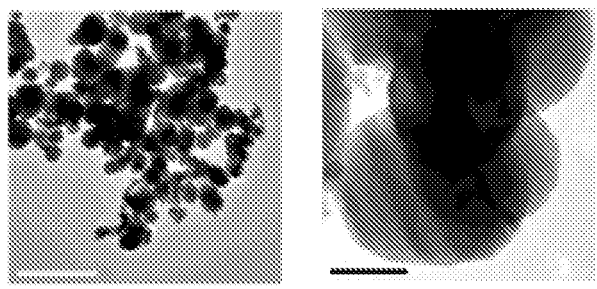
Figure 1 a-d.

| Time | M-32-Init. sample | M-32-R.3 sample |
|---|---|---|
| t = 0 min | 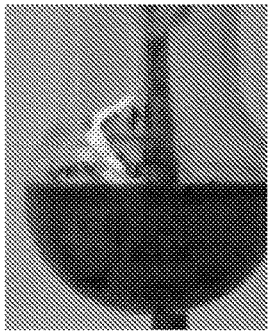 |  |
| t = 5 min |  |  |
| t = 1 h | 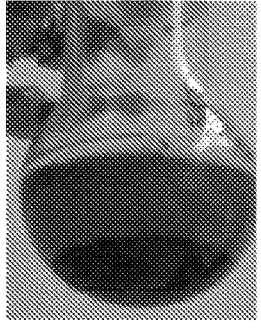 |  |
Figure 3.

US 10,726,981 B2

FUNCTIONALIZED MAGNETIC NANOPARTICLES AND A METHOD FOR PREPARATION THEREOF

PRIORITY

This application is a U.S. national application of PCT-application PCT/FI2016/050658 filed on Sep. 21, 2016 and claiming priority of Finnish application FI 20155680 filed on Sep. 23, 2015, the contents of all of which are incorporated herein by reference.

FIELD

The present disclosure relates to magnetic nanoparticles which are functionalized to be highly dispersible in water, and to a method for preparation thereof. These nanoparticles are suitable for use in water treatment, in particular, in osmotic processes.

BACKGROUND ART

Purified water may be obtained from impure water by osmotic separation processes. Osmosis is the movement of a solvent across a semipermeable membrane towards a higher concentration of solute.

Osmosis may be used directly to achieve separation of water from a solution containing unwanted solutes such as impurities. Forward osmosis (FO) is an osmotic process that, like reverse osmosis (RO), uses a semi-permeable membrane to effect separation of water from dissolved solutes. The driving force in FO is an osmotic pressure gradient, such that a "draw" solution of high concentration relative to that of the feed solution, is used to induce a net flow of water through the membrane into the draw solution, thus effectively separating the feed water from its solutes. In contrast, the reverse osmosis process uses hydraulic pressure as the driving force for separation, which serves to counteract the osmotic pressure gradient that would otherwise favor water flux from the permeate to the feed. In FO the diluted draw solution may be used as such or sent to a secondary separation process for the removal of the draw solute.

Forward osmosis is an area of ongoing research, focusing on applications in desalination, water purification, water treatment and the like. One area of research in FO and regeneration of draw solutions involves direct removal of draw solutes by means of e.g. a magnetic field. Small nanoscale magnetic particles i.e. magnetic nanoparticles (MNP) are suspended in solution creating osmotic pressure sufficient for the separation of water from a dilute feed. Once the draw solution containing these particles has been diluted by the FO water flux, they may be separated from that solution by use of a magnet.

In order to increase the dispersibility of MNPs the surfaces thereof may be modified by functionalization. Current hydrophilic MNPs for use in forward osmosis are often prepared using a thermal decomposition method which requires elevated temperature. Moreover, the available methods typically involve utilization of high-boiling point organic solvents.

For example, WO2011/099941 discloses a hydrophilic magnetic nanoparticle including a magnetic core composed of $MFe_2O_4$ or $Fe_2O_3$ and a plurality of hydrophilic polymers covalently bound to the magnetic core. The preferred hydrophilic polymers are poly(ethylene glycol) diacids, polyacrylic acids, poly(styrene)-block-poly(acrylic acid)s, poly(acrylic acid-co-maleic acid)s, poly(acrylamide-co-acrylic acid)s and poly(vinyl acetate-co-crotonic acid)s. The hydrophilic magnetic nanoparticles are prepared by passing an inert gas to a hydrophilic organic solvent containing an oxygen-containing iron salt and a hydrophilic polymer. The organic solvent has a boiling point of 150° C. or higher. The solvent is heated to a temperature of 150° C.-500° C. to obtain hydrophilic magnetic nanoparticles. The hydrophilic magnetic nanoparticle has a water flux value of 8-40 $l/m^2h$ that decreases 10% or less after use as a draw solute.

A major problem in existing magnetic nanoparticle based draw solutions is the large energy consumption in the forward osmosis technology due to preparation of suitable hydrophilic magnetic nanoparticles.

There are several publications disclosing methods for preparation of hydrophilic MNPs for use as solutes based on thermal decomposition techniques involving elevated temperatures and high-boiling point organic solvents. Similarly, publications are available describing the use of co-precipitation methods by an alkali at elevated temperatures.

The drawbacks in both of these methods are the high energy consumption and utilization of organic solvents.

Therefore, there is a need for a method which overcomes these disadvantages to render forward osmosis a competitive and attractive technology for use in e.g. water purification.

SUMMARY OF THE PRESENT DISCLOSURE

One object of the present disclosure is to provide highly hydrophilic magnetic nanoparticles and a method for preparation thereof.

Another object of the present disclosure is to provide a method for manufacturing highly hydrophilic magnetic nanoparticles which can be regenerated easily without intensive heat treatment.

Yet, another object of the present disclosure is to provide highly hydrophilic magnetic nanoparticles which can be efficiently separated at low temperatures.

These objects are attained with the method and product as depicted by the independent claims.

Typical method according to the invention for manufacturing a covalently functionalized coated magnetic nanoparticle, which includes forming a shell of a hydrophilic polymer coating layer on top of a magnetic metal core coated with a carbon coating, comprising the steps of (i) providing a particle comprising a magnetic metal core coated with a carbon coating, and (ii) subjecting the surface of the particle from step (i) to covalent functionalization by generating amino reactive groups on said surface via diazonium chemistry, and (iii) carrying out an irreversible attachment of an atom transfer radical polymerization (ATRP) initiator on the surface obtained from step (ii), and (iv) forming a hydrophilic polymer layer on the surface obtained from step (ii) by a surface initiated atom transfer radical polymerization (SI-ATRP) reaction with a monomer comprising N-isopropylacrylamide (NIPAM).

Typical covalently functionalized coated magnetic nanoparticles comprises a magnetic metal core, a carbon coating on said core, and a shell of a hydrophilic poly(N-isopropylacrylamine) (PNIPAM) polymer coating layer. Preferably, the particles are manufactured by the method according to the invention.

The dependent claims depict some of the preferred embodiments.

In one aspect the present disclosure provides a method for manufacturing coated magnetic nanoparticles. These nanoparticles are covalently functionalized and the structure thereof includes a shell of a hydrophilic polymer coating layer formed on top of a magnetic metal core which is coated with a carbon coating. The method of manufacturing these covalently functionalized coated magnetic nanoparticles comprises the steps of first providing a particle comprising a magnetic metal core which is coated with a carbon coating. Secondly, the surface of this particle is subjected to covalent functionalization which is achieved by generating amino reactive groups on said surface using diazonium chemistry. The third step involves carrying out an irreversible attachment of an initiator on the surface, such as an atom transfer radical polymerization (ATRP) initiator. And finally, a hydrophilic polymer layer is formed on the surface by surface initiated atom transfer radical polymerization (SI-ATRP) reaction with a monomer.

In another aspect, covalently functionalized coated magnetic nanoparticles are provided which comprise a magnetic metal core, a carbon coating on said core, and a shell of a hydrophilic polymer coating layer thereon. These nanoparticles are preferably obtained by the above described method.

Yet, in a further aspect the present disclosure provides use of the covalently functionalized coated magnetic nanoparticles of the present disclosure for water treatment.

The method of the present disclosure allows functionalization of magnetic nanoparticles with a hydrophilic polymer, preferably poly(N-isopropylacrylamine) (PNIPAM), in a controlled manner.

The magnetic metal nanoparticles obtained by the method of the present disclosure have significantly higher saturation magnetization than e.g. oxides typically used. Therefore, the separation of particles is fast and efficient in the presence of a magnetic field. The specific surface area as well as the mobility of the particles is high due to their extremely small size. Thin graphitic carbon coating, such as from 2 to 5 nm, allows covalent functionalization of the particles. Because of the coating the metallic particles are stable at a wide pH range, at a high temperature, such as at a temperature above 200° C., and in most solvents.

The use of organic solvents is not necessary in the method of the present disclosure. The reactions may take place in aqueous solvent, such as water.

Moreover, the method of the present disclosure does not require the use of thermal decomposition and elevated temperatures. Considerable energy savings are gained as the functionalization may take place at low temperature. Novel alternatives for draw solution are provided by the use of the magnetic nanoparticles of the present disclosure which can be regenerated easily without intensive heat treatment by applying an external magnetic field.

The functionalized magnetic nanoparticles of the present disclosure have hydrophilic surface and high surface area-to-volume ratio. Therefore, a high osmotic pressure can be generated due to affinity to water molecules and the small size. Moreover, the covalent functionalization of the magnetic nanoparticle surfaces with short polymer chains increases their chemical stability and prevents their aggregation. The reduced aggregation improves the efficiency of the functionalized magnetic nanoparticles as draw solution in the forward osmosis technique.

BRIEF DESCRIPTION OF THE FIGURES

FIG. 1 a-d depicts TEM images of carbon coated cobalt magnetic nanoparticles according to the present disclosure.

FIG. 3 shows stability of water dispersions of functionalized nanoparticles according to the present disclosure after initialization.

DETAILED DESCRIPTION OF THE DISCLOSURE

Figure 2:
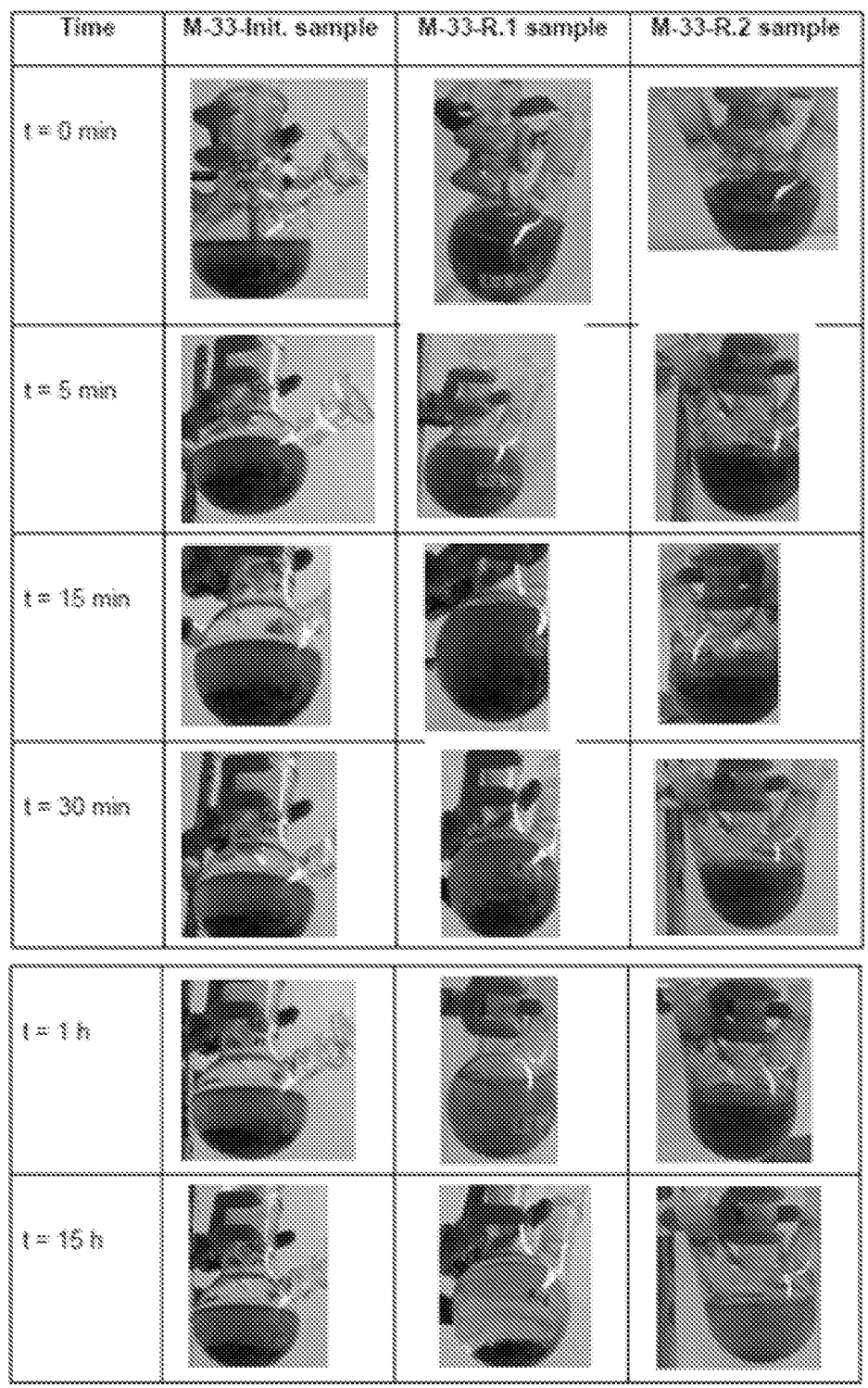
FIG. 2 shows the stability of water dispersions of functionalized nanoparticles according to the present disclosure.

In the method of the present disclosure magnetic nanoparticles (MNPs) are functionalized with a hydrophilic poly (N-isopropylacrylamide) (PNIPAM) polymer. The preparation method involves the coating the nanoparticles first with a coating layer, such as carbon. The coated nanoparticles are subsequently exposed to covalent functionalization with a polymer.

The covalent functionalization is realized using an atom transfer radical polymerization (ATRP) technique. In order to be able to use ATRP, an ATRP initiator needs to be formed on the surface. This is enabled by first covalently functionalizing the surface of the carbon coated magnetic metal nanoparticles by diazonium chemistry.

The applied process steps are disclosed and discussed in detail in the following paragraphs.

In one embodiment the reactions of the covalent functionalization, initiation and ATRP steps take place in an aqueous solvent.

Preparation of Carbon Coated Metal Nanoparticles

In the method of the present disclosure coated magnetic metal nanoparticles used as the magnetic carries for the hydrophilically active polymer are prepared first by coating with carbon.

In one embodiment the magnetic metal core is prepared by hydrogen reduction method, preferably by hydrogen reduction from metal halides, such as chlorides.

In the hydrogen reduction method the carbon coating is prepared by feeding metal halide powder into a heated evaporation column including inert inner material for reaction surface enhancement. The powder precursor is carried by an inert gas flow into a reaction zone of the evaporation column whereto hydrogen is added. Carbon coating is formed by introducing an additional suitable carbon containing gas to this reactor.

In one embodiment a single piece quartz reactor is applied comprising the evaporation column. The metal precursor powder, such as $CoCl_2$, is fed by a powder feeder to the heated evaporation column composed of porous alumina pellets. The column temperature is chosen to comply with the requirements of the metal powder used. For example, for $CoCl_2$ powder 800° C. is a suitable temperature. The evaporated metal precursor is carried along with nitrogen gas flow to the reaction zone of the reactor. The use of the evaporation column maximizes the evaporation area of the precursor. Carbon coating on metal nanoparticles, such as cobalt nanoparticles, is obtained by feeding an ethene-nitrogen gas mixture into the reaction zone together with hydrogen. When using Co the temperature at the reaction zone is about 950° C. Ethene decomposes to methane ($CH_4$), ethane ($C_2H_6$) and carbon (C) in the reaction zone of the reactor. The reaction is preferably incomplete and 50 mol-% or more of the fed ethene remains unreacted. The metal surface of the magnetic metal nanoparticles catalysis the decomposition reaction of ethene and the formation of the carbon layer. The formed carbon coating suppresses further growth of the magnetic metal nanoparticles and aids in controlling the average diameter of the formed core nanoparticles. After the reaction zone the ethene-nitrogen gas flow is quenched by purging the reactor with room temperature nitrogen gas. At the end of the reactor line the carbon coated metal nanoparticles are collected on PTFE filter bags.

In one embodiment the carbon containing gas is selected from a wide range of simple hydrocarbons, preferably from alkanes, alkenes or alkynes, provided that they are gaseous at room temperature. Most preferably, the carbon coating is prepared by catalytic decomposition of ethene.

The concentration of the carbon containing gas fed into the reactor depends on the desired nanoparticle quality and dimensions. It may be used to tailor the nanoparticles. Preferably, the amount of the carbon containing gas in the reaction zone is from 0.05 to 2 vol-%, more preferably from 0.07 to 1.5 vol-%, such as from 0.09 to 1 vol-%.

In one embodiment two batches of carbon coated Co nanoparticles are produced. In the first batch the ethane ($C_2H_4$) concentration in the reaction zone is 0.9 vol-%. In the second batch the concentration is 0.09 vol-%. The diameter of the Co nanoparticles is estimated from the electron microscopy images. The median diameter of the primary particles is approximately 28 nm with higher ethene concentration and about 97 nm with the lower ethane concentration.

In one embodiment the carbon coating is a graphitic carbon coating. Preferably, the thickness of the graphitic carbon coating is from 2 to 5 nm, more preferably from 3 to 4 nm. Graphitic carbon allows covalent functionalization of the particles preventing thus the loss of ligands. Because of the coating the metallic particles are stable at a wide range of pH, at high temperature, preferably at least above 200° C., and in most solvents.

Carbon coated magnetic metal nanoparticles have the advantage of providing large surface area for subsequent surface modifications and easy separation for the final application.

In one embodiment the magnetic metal nanoparticles used as core particles are preferably ferromagnetic metal nanoparticles.

In one embodiment the magnetic metal core of the coated nanoparticles comprises cobalt, nickel, iron or any mixture thereof. Ferromagnetic metals offer at least three times higher magnetic properties than ferrites, which enables fast separation of particles even from large liquid volumes. The suitable precursor concentrations for these metals need to be experimentally determined for each metal separately as they are dependent on the metal precursor properties.

In one embodiment, the metal nanoparticles comprise iron. The use of iron is advantageous because of its low price and good availability. Moreover, the reaction of carbon precursor on the surface of iron particles is much faster than e.g. on cobalt.

In another embodiment, the metal nanoparticles comprise cobalt. Cobalt precursors have, in particular, a fast reaction rate resulting in a small particle size.

In another embodiment, the metal nanoparticles comprise nickel which provides a clearly more affordable alternative to cobalt.

The precursors for the magnetic metal core particles preferably comprise chlorides of the preferred metals, such as $CoCl_2$, $FeCl_2$, $FeCl_3$ and $NiCl_2$.

In one embodiment the number average primary particle diameter of said particles is from 20 to 150 nm, preferably from 25 to 100 nm.

Covalent Functionalization of Carbon Coated Magnetic Metal Nanoparticles by Diazonium Chemistry By diazonium chemistry is meant those chemical reactions involving a diazonium compound. Diazonium compounds are a large group of organic compounds with the general formula R—N≡N⁺ X⁻ where R can be any organic residue such as alkyl or aryl and X is an inorganic or organic anion such as a halogen.

After carbon coating the magnetic metal nanoparticles, the nanoparticles according to the present disclosure are covalently functionalized by diazonium chemistry which enables irreversible attachment of a polymer as depicted by the following reaction scheme, illustrated by applying 4-aminophenylamine as an example compound:

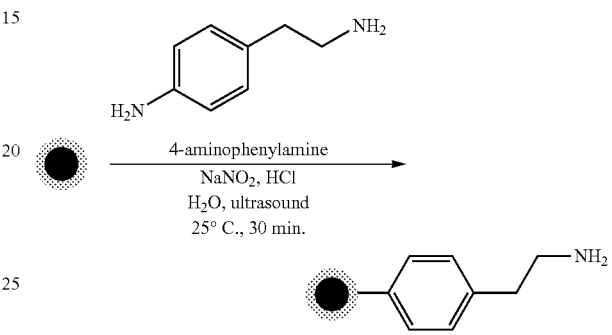

Covalently functionalizing the carbon coated magnetic nanoparticles by diazonium chemistry generates amino reactive groups which allow irreversible attachment of an ATRP initiator.

In one embodiment of the present disclosure, covalent attachment of the suitable amine, such as 4-aminophenylamine, is performed by diazonium chemistry for carbon coated metal, such as Co, nanoparticles.

The reaction product is confirmed by measuring the relevant peaks using Fourier transform infrared (FTIR) spectroscopy.

In one embodiment of the present disclosure the FTIR spectrum of the carbon coated covalently functionalized metal nanoparticle after the diazonium reaction exhibits the following characteristic absorption peaks: about 1631 cm−1 (N—H absorption), about 1380 cm−1 (C—N absorption), about 823 cm−1 (aromatic ring).

In the method according to the present disclosure, MNPs are dispersed in distilled water using an ultrasonic bath. A mixture of a suitable amine, such as 4-aminophenylamine, distilled water and an acid, such as hydrochloric acid, is prepared. The mixture is added to the MNPs dispersion under sonication. A cold aqueous solution of a nitrate salt, such as sodium nitrite, $NaNO_2$, is added slowly to the mixture of MNPs and the amine, thus generating diazonium ions. The reaction time is preferably less than 1 h, more preferably less than 45 min, such as 30 min. Gas formation may be observed.

After the reaction, the MNPs may be separated by magnetic decantation. The separated MNPs are purified by washing, preferably by water, ethanol, ethyl acetate and acetone, followed by sonication. Finally, the samples are dried, preferably in a vacuum desiccator.

The reaction yield is 50% or more, preferably 55% or more, more preferably more than 60%. The reaction yield was calculated by dividing the amount of the final product by the sum of the amount of the reagents used, namely $$\text{Yield} = m_{product} \times 100 / (m_{MNP} + m_{amine})$$

The efficiency of the recovery may be enhanced by recovering the product multiple times. The overall efficiency for the final product is at least 90%, preferably even over 90%.

The generated amine group forms an attractive surface intermediate for the ATPR initiator formation.

Covalent Attachment of the ATRP Initiator

In one embodiment, the ATRP initiator precursor halide, such as 2-bromo-2-methylpropionyl bromide, is covalently attached on the surface of previously formed amino functionalized magnetic nanoparticle through amidation reaction, namely

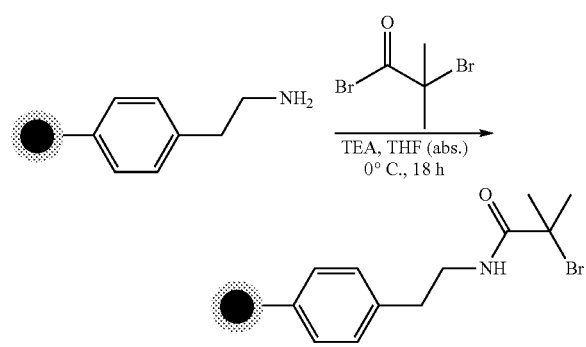

In this reaction MNPs with amino group are dispersed in an organic solvent such as tetrahydrofuran under nitrogen atmosphere and sonication. The temperature of the reaction is maintained at about zero with constant mixing. The halide is added with amine solvent, such as tetrahydroamine, and the reaction mixture is mixed for several hours, such as 18 h, before separation of the MNPs.

In the present disclosure the preferred initiator precursor is selected from the group consisting of 2-bromo-2-methylpropionyl bromide, 2-bromobutyrate, ethyl-2-bromopropionate and 2-chloropropionyl chloride.

In one embodiment 2-bromo-2-methylpropionyl bromide is a preferred initiator precursor since it produces initiating radicals faster than 2-bromobutyrate and ethyl 2-bromopropionate due to better stabilization of the generated radicals after the halogen abstraction step. Moreover, the C—Br bond is weaker than the C—Cl one to undergo the homolytic cleavage. Therefore, the selected preferred initiator is also more efficient than e.g. 2-chloropropionyl chloride.

Most preferably, the initiator is the reaction product of 4-amoniphenylamine which is covalently attached to the surface of the MNP for generation of amino reactive groups which allow irreversible attachment of the initiator. Fast initiation insures consistency of the number of propagating chains leading to narrow molecular weight distributions. The shape or structure of the initiator typically determines the architecture of the hydrophilic polymer.

The reaction yield may be calculated by dividing the amount of final product to the sum of amount of reagents used:

$$\text{Yield} = m_{product} \times 100/(m_{amino\ funct.\ MNP} + m_{ATRP\ initiator})$$

The reaction yield is at least 80%.

The reaction product of the covalent initiation is confirmed by measuring the relevant peaks using Fourier transform infrared (FTIR) spectroscopy.

In one embodiment of the present disclosure the FTIR spectrum of the carbon coated covalently functionalized metal nanoparticle after the diazonium reaction and covalent attachment of 2-bromo-2-methylpropionyl bromide ATRP initiator exhibits the following characteristic absorption peaks: about 1633 cm−1, about 1384 cm−1, about 1210 cm−1, about 1151 cm−1 and about 807 cm−1.

Subsequently, the surface of the nanoparticle is ready to be subjected to ATRP polymerization.

ATRP Polymerization of a Hydrophilic Monomer

Atom transfer radical polymerization (ATRP) is a reversible deactivation by atom transfer-polymerization based on establishing a rapid dynamic equilibrium between an active and a dormant species. As defined by IUPAC, ATRP is controlled reversible-deactivation radical polymerization in which the deactivation of the radicals involves reversible atom transfer or reversible group transfer catalyzed usually, though not exclusively, by transition-metal complexes. Generally, it is a means of forming a carbon-carbon bond through a reversible redox process catalyzed by a transition metal complex, which takes place with concomitant abstraction of a halogen atom from the dormant species. As the name implies, the atom transfer step is the key step in the reaction responsible for uniform polymer chain growth.

By SI-ATRP is meant a surface assisted ATRP reaction wherein the catalyst or initiator is bound to a surface.

In the present disclosure a preferred ATRP initiator, such as 2-bromo-2-methylpropionyl bromide, contains a C-halide bond, such as C—Br bond, which is homolytically and reversibly cleaved, generating radical active species for controlled radical polymerization. The ATRP polymerization of a thermoresponsive polymer, such as poly (N-isopropylacrylamide) (PNIPAM), from the NIPAM monomer on the surface of the magnetic carbon coated cobalt nanoparticles takes place as follows:

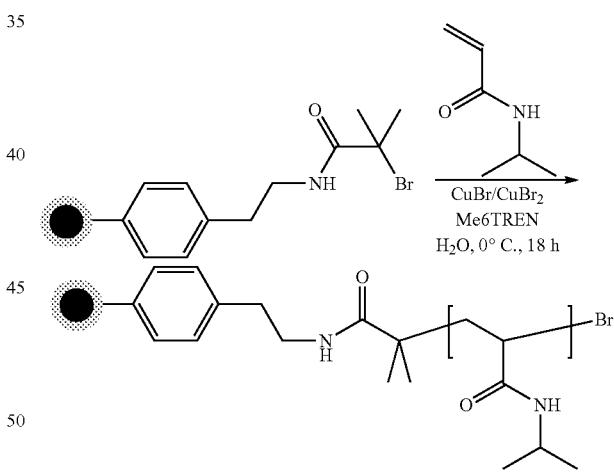

The 'grafting-from' method is the most promising way for preparation of well-defined core/shell materials. In the grafting-from method, the macromolecular backbone is chemically modified in order to introduce active sites capable of initiating functionality. The initiating sites can be incorporated by copolymerization, can be incorporated in a post polymerization reaction, or can already be a part of the polymer. If the number of active sites along the backbone participates in the formation of one branch, then the number of chains grafted to the macromolecule can be controlled by the number of active sites. Even though the number of grafted chains can be controlled, there may be a difference in the lengths of each grafted chain due to kinetic and steric hindrance effects. "Grafting-from" reactions have been conducted from polyethylene, polyvinylchloride and polyisobutylene. Different techniques such as anionic grafting, cationic grafting, ATRP, and free radical polymerization have been used in the synthesis of grafting from copolymers.

By using surface initiated atom transfer polymerization (SI-ATRP), linear polymer brushes with low polydispersity and little affinity to side reactions may be covalently linked to the surface of magnetic nanoparticles.

As depicted above, there are four important variable components in the ATRP method, namely the monomer, initiator, catalyst and solvent. ATRP successfully leads to polymers of high number average molecular weight and to a narrow polydispersity index when the concentration of the propagating radical balances the rate of radical termination. The propagating rate is unique to each individual monomer. Therefore, it is important that the other components of the polymerization, initiator, catalysts, ligands and solvents, are optimized in order for the concentration of the dormant species to be greater than the concentration of the propagating radical and yet not too great to slow down or halt the reaction.

In one embodiment the monomer may be selected from the group consisting of acrylic acid (AA), 2-acrylamido-2-methyl-1-propanesulfonic acid (PAMPSA), N-isopropylacrylamide (NIPAM), methacrylic acid (MAA) and acrylamide (AM) and mixtures thereof. The use of AA and MAA requires polymerization of protected monomers followed by a deprotection step compared to use of PAMPSA, NIPAM or AM. Polymerization of AM under typical ATRP conditions shows a lower ATRP equilibrium constant compared to the other monomers. NIPAM provides particularly good hydrophilicity and thermosensitivity and the use thereof in the corresponding MNPs prevents aggregation, provides a positive effect on the performance of the draw solution in FO, and aids in regeneration of the MNPs when applying an external magnetic field due to change in the polymer conformation with temperature.

In one preferred embodiment the monomer in the present disclosure the monomer is thermoresponsive monomer, such as N-isopropylacrylamide (NIPAM). Preferably, the monomer is thermoresponsive monomer having a low critical solution temperature (LOST), such as below 35° C.

In another embodiment the monomer in the present disclosure the monomer is a polyelectrolyte, such as poly(2-acrylamido-2-methyl-1-propanesulfonic acid) (PAMPSA).

When polymerized, NIPAM produces a polymer which is hydrophilic and thermoresponsive, and may be obtained by ATRP without the deprotection step. On the other hand, PAMPSA is a strong anionic polyelectrolyte without pH sensitivity.

Most preferably, the monomer comprises N-isopropylacrylamide (NIPAM). When polymerized, poly(N-isopropylacrylamide) PNIPAM has substituents that are able to effectively stabilize the propagating radicals. PNIPAM is a pH sensitive and thermosensitive hydrogel, having the following structure:

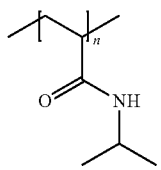

In dilute solutions, it undergoes a coil-to-globule transition. PNIPAM possesses an inverse solubility upon heating. It changes hydrophilicity and hydrophobicity abruptly at its lower critical solution temperature (LOST). At lower temperatures PNIPAM orders itself in solution in order to hydrogen bond with the already arranged water molecules. The water molecules must reorient around the nonpolar regions of PNIPAM which results in decreased entropy. At lower temperatures, such as room temperature, the negative enthalpy term from hydrogen bonding effects dominates the Gibbs free energy, causing PNIPAM to absorb water and dissolve in solution. At higher temperatures, the entropy term dominates, causing the PNIPAM to release water and phase separate.

The preferred thermoresponsive polymer, in particular, PNIPAM, has a reversible lower critical solution temperature (LOST) at 32° C. At this temperature a phase transition from a swollen hydrated state to a shrunken dehydrated state takes place. This behavior is particularly favorable for efficient separation of magnetic nanoparticles using permanent magnets.

The number of growing polymer chains is determined by the initiator.

The metal catalyst is an important component of ATRP because it determines the equilibrium constant between the active and dormant species. This equilibrium determines the polymerization rate. Equilibrium constant too small may inhibit or slow the polymerization while an equilibrium constant too large leads to a high distribution of chain lengths.

There are several requirements for the metal catalyst: There needs to be two accessible oxidation states that are separated by one electron, the metal center needs to have a reasonable affinity for halogens, the coordination sphere of the metal needs to be expandable when it is oxidized so to be able to accommodate the halogen, and the transition metal catalyst should not lead to significant side reactions, such as irreversible coupling with the propagating radicals and catalytic radical termination.

In one embodiment the metal catalyst comprises Cu, Ni, Ru, Pd, Rh or Re. Preferably, the metal catalyst is Cu since it is superior in terms of versatility i.e. activity and selectivity, cost and high polymerization rate while still maintaining an overall good control.

The metal catalyst system applied preferably includes a nitrogen based ligand, such as tris[2-(dimethylamino)ethyl] amine (Me6TREN), as both reducing agent and ligand for atom transfer radical polymerization. The selected branched tetradentate ligand, Me6TREN, provides the most strongly reducing ATRP catalyst. The $CuBr_2$/Me6TREN is about 10,000 times more efficient than complexes involving e.g. bipyridyl ligands, and lower concentrations are required.

Most preferably, copper is in the form of $CuBr/CuBr_2$ as the catalyst, and in particular, 2-bromo-2-methylpropionyl bromide, is used as the initiator. Remarkably high activity catalytic system ($CuBr_2$/Me6TREN) enables the ambient temperature polymerization and biradical termination reactions are low.

In one embodiment the solvent to be used in the ATRP of the present disclosure is selected from toluene, 1,4-dioxane, xylene, anisole, DMF, DMSO, water, methanol or acetonitrile. Most preferably, the solvent is water due to the increased environmental concern and absence of volatile organic compounds.

In one embodiment the ATRP of the monomer is initiated by a suitable catalyst system thereto. The catalyst system is degassed by an inert gas, such as nitrogen. The additional ligand is added and, subsequently, the MNP including the initiator. The temperature of the reaction mixture is below 10° C., preferably below 5° C., most preferably at about zero. The reaction takes place in about less than one day, preferably less than 20 h. The polymerization is terminated by exposing the reaction mixture to air. The product may be separated, washed and dried.

The reaction yield is calculated by dividing the amount of final product to the sum of amount of reagents used:

$$Yield = m_{product} \times 100 / (m_{ATRP\ init.-MNP} + m_{MONOMER})$$

The reaction yield is 50% or more. An additional magnetic decantation improves the recovery of the final product and therefore increases the reaction total yield further.

The successful linkage of the polymer may be confirmed by FTIR spectroscopy.

In one embodiment wherein magnetic carbon coated cobalt nanoparticles are covalently functionalized by 4-aminophenylamine, wherein the ATRP initiator is 2-bromo-2-methylpropionyl bromide and wherein NIPAM is used as the monomer, the FTIR spectrum reveals amide absorption bands C=O: 1636 cm−1 and N—H: 1555 cm−1.

The final hydrophilically modified MNP product obtained may be separated easily after use from a dispersing medium, such as a draw solution, by means of a permanent magnet.

In one embodiment a permanent magnet for separation of the magnetic metal nanoparticles is used. Preferably, the permanent magnet comprises neodymium-based permanent magnets.

In one embodiment magnetic metal nanoparticles are separated by magnetic decantation using a neodymium-based permanent magnet. The magnetic decantation is preferably repeated at least twice in order to ensure the quantitative separation of functionalized MNPs.

In yet another embodiment the magnet used for separation may further be used to press the excess water from the particles.

As second aspect, the present disclosure provides covalently functionalized coated magnetic nanoparticles, comprising a magnetic metal core, a carbon coating on said core, and a shell of a hydrophilic polymer coating layer.

Preferably, the nanoparticles are manufactured as described above, and have the same characterizing product features. According to a preferred embodiment, covalently functionalized coated magnetic nanoparticles comprise a magnetic metal core, a carbon coating on said core, and a shell of a hydrophilic poly(N-isopropylacrylamine) (PNIPAM) polymer coating layer.

As third aspect, the present disclosure provides the use of the produced magnetic metal nanoparticles for treatment of impure water or wastewater.

In one embodiment the coated magnetic nanoparticles of the present disclosure are used for purifying water or wastewater, especially for removal of impurities thereof.

In one embodiment the coated magnetic nanoparticles of the present disclosure are used for treatment of impure water in osmosis based process.

In one embodiment the coated magnetic nanoparticles of the present disclosure are used in a draw solution for osmosis, in particular, forward osmosis (FO) technique.

Stability of the covalently functionalized magnetic metal nanoparticles of the present disclosure in water dispersions depends on the amount of hydrophilic polymer attached on the metal nanoparticles.

In one embodiment water dispersions based on MNP-PNIPAM containing increased amount of PNIPAM, such as from 1.9 to 2.1 mmole PNIPAM/g MNP, are stable for at least 1 h, preferably at least 10 h.

Only partial sedimentation is observed after 15 h. The observed sedimentation of the particles indicates that the particles are in a form of large agglomerates within the solution. The stability of the dispersion may be substantially increased by applying energetic sonication before the functionalization of the carbon surface. Functionalization and subsequent polymer coating prevent forming of the agglomerates at a later stage of the process. Breaking of the agglomerates increases the specific surface area (SSA) of the magnetic particles and enable thus to increase the amount of active polymer within the powder.

Small nanoparticles also have a much higher mobility in the liquid solution, which substantially improves the magnetic collection efficiency as well as the time required for separation of the material from the solution.

In one embodiment screening of the LOST by visual observation of the macroscopic phase separation for aqueous dispersions of MNP-PNIPAM indicates that LOST value is between 30-35° C. If the temperature is elevated to 40° C. MNP-PNIPAM samples precipitate out from the aqueous solutions.

The osmotic pressure may be increased by increasing the mass loading of the particles in the solution. In order to increase the loading, the particles should be well dispersed into the solution, because the stability of magnetic dispersion decreases with increasing mass of particles. However, the collection efficiency also increases with the loading due to magnetic forces between the particles improving the overall performance of the system.

In one embodiment the osmotic pressure is increased by functionalization of MNPs with longer polymer chains.

In one embodiment the osmotic pressure is increased by functionalization of MNPs with higher grafting density.

In one embodiment the osmotic pressure is increased by functionalization of MNPs with longer polymer chains and higher grafting density.

The grafting density may be estimated from elemental microanalysis combined with thermogravimetric analysis.

The method of the present disclosure may further be used for functionalization of MNPs with polyelectrolytes in a controlled manner. Varying types of structures with good potential for draw solution application may be prepared by using the same chemistry. Examples of the possible systems comprise polyacrylic acid functionalized MNP (MNP-PAA), poly (2-acrylamido-2-methyl-1-propanesulfonic acid) (PAMSA) functionalized MNP (MNP-PAMPSA), MNP-PNIPAM-PAA or MNP-PNIPAM-PAMPSA.

In one embodiment the magnetic nature of the powder is applied to increase the osmotic pressure within the system. Using a magnetic field the magnetic nanoparticles are collected on the surface of the membrane increasing the local osmotic pressure in the system. When the active polymer has been saturated with water, the direction of the magnetic field is reversed and the particles removed from the membrane surface.

The magnetic metal nanoparticles of the present disclosure may further be applied in other technologies, such as in enzyme immobilization or concentration processes for precious material from aqueous solutions.

The present disclosure is further illustrated by the following non-limiting examples.

EXAMPLES

Materials and equipment used in the preparation of the magnetic metal nanoparticles according to the present disclosure comprised 4-Aminophenylamine (Across, 95%), Sodium nitrite (Fluka, 99%), trimethylamine (Fluka, purum 98%), 2-bromo-2-methylpropionyl bromide (Alfa Aaesar, 97%) which were used for functionalization of MNPs with ATRP initiator as received. Copper (I) bromide (Fluka, 98%), copper (II) bromide (Fluka, 99%), tri (2 dimethylaminoethyl) amine, Me6TREN, (Aldrich 97%), N-isopropylacrylamide (Sigma-Aldrich, 99%) used for functionalization of MNPs by surface initiated atom transfer radical polymerization were used as received.

The air sensitive reactions were handled under nitrogen atmosphere.

A neodymium-based permanent magnet (N42, Q-40-40-20-N, Webcraft GmbH) was used for magnetic decantation of functionalized MNPs.

FTIR spectra were recorded by Perkin Elmer FTIR System Spectrum BX instrument. Samples were pressed into tablets together with KBr.

Aqueous dispersions of functionalized MNPs were prepared using an ultrasonic bath, VWR Ultrasonic Cleaner, B-3001, Leuven.

Osmotic pressure measurements were performed by using a VAPRO osmometer, Wescor.

Example 1

Production of Carbon-Coated Cobalt (C/Co) Nanoparticle (NP)

In accordance with the present disclosure, carbon coated cobalt nanoparticles were used as the magnetic carries for the hydrophilically active polymer. Cobalt was chosen as the magnetic metal material, because the parameters for the synthesis of these particles were known from previous experiences.

The synthesis of the nanoparticles was performed using a single piece quartz reactor. The precursor powder $CoCl_2$ was fed by a powder feeder to a heated evaporation column composed of porous alumina pellets. The column temperature was 800° C. The evaporated precursor was carried along a nitrogen gas flow to a reaction zone. The use of the evaporation column maximized the evaporation area of the precursor. In the reaction zone, hydrogen gas was fed to the metal chloride-nitrogen mixture at 950° C.

The carbon coating on the cobalt nanoparticles was obtained by feeding an ethene-nitrogen mixture to the reaction zone together with hydrogen. Ethene decomposed to methane ($CH_4$), ethane ($C_2H_6$) and carbon (C) in the reaction zone. The reaction was incomplete and over 50 mol-% of the ethene remained unreacted. The metal surface catalyzed the decomposition reaction and the formation of carbon layer. This suppressed further growth of the metal nanoparticles and controlled the average diameter of the core particles. After the reaction zone the flow was quenched with room temperature nitrogen gas. At the end of the line the C/Co NPs were collected on PTFE filter bags.

Three batches of carbon coated particles were produced. In the first and third batch (M-32) the ethane ($C_2H_4$) concentration in the reaction zone was 0.9 vol-%. In the second batch (M-33) the concentration was 0.09 vol-%. The diameter of the particles was estimated from the electron microscopy images of the particle (FIG. 1). The median diameter of the primary particles was approximately 28 nm with higher ethene concentration and about 97 nm with the lower concentration. The produced amounts of powders in the three batches were 5 g, 10 g and 9 g.

Example 2

Covalent Functionalization of C/Co Nanoparticles by Diazonium Chemistry

Covalent attachment of 4-aminophenylamine was performed by diazonium chemistry for carbon coated Co nanoparticles.

Two batches of C/Co nanoparticles with different particle sizes, 28 nm (M-32 batch) and 97 nm (M-33 batch) median diameter, obtained as described in example 1, were used for covalent attachment of 4-aminophenylamine by diazonium chemistry.

In the procedure applied to both the MNP batches, 1 g of MNPs was dispersed in 20 mL distilled water using an ultrasonic bath for 45 min. A mixture of 4-aminophenylamine (0.386 mL, 3 mmol), 7.5 mL distilled water and 0.75 mL hydrochloric acid 32% by weight was prepared, resulting in an yellowish solution. The mixture was added to the MNPs dispersion under sonication. A cold solution (0° C.) of sodium nitrite, $NaNO_2$, (0.3075 g, 4.5 mmol) in 7.5 mL distilled water was added drop wise to the mixture of MNPs and 4-aminophenylamine in order to generate the diazonium ions. The reaction time was 30 min and gas formation was immediately observed.

After reaction, the MNPs were separated by magnetic decantation using a neodymium based permanent magnet. The magnetic decantation was repeated twice in order to ensure the quantitative separation of functionalized MNPs. The separated MNPs were purified by washing with distilled water, ethanol, ethyl acetate and acetone (3×50 mL) followed by sonication for 5 min in each solvent. Finally the samples were dried in a vacuum desiccator. The amount of the product was 0.9053 g and the reaction yield was 64.27%. The reaction yield was calculated by dividing the amount of the final product by the sum of the amount of the reagents used.

Table 1 shows the efficiency of recovery of the functionalized MNPs and the yield of the reaction.

TABLE 1

| Sample (code) | MNP (batch) | Efficiency of MNPs recovery (%) | | Reaction yield after $2^{nd}$ recovery (%) |
| --- | --- | --- | --- | --- |
| | | $1^{st}$ recovery | $2^{nd}$ recovery (cumulative value) | |
| M-33 functionalization, step 1 | M-33 | 85.3 | 90.5 | 64.3 |
| M-32 functionalization, step 1 | M-32 | 97.0 | 97.3 | 69.0 |

The reaction was confirmed by the presence of relevant peaks in the FTIR spectra: 1631 cm−1 (N—H absorption), 1380 cm−1 (C—N absorption), 823 cm−1 (aromatic ring).

Example 3

Covalent Attachment of the ATRP Initiator

The ATRP initiator, 2-bromo-2-methylpropionyl bromide, was covalently linked by amidation reaction to the surface of amino functionalized MNPs.

0.8532 g amino functionalized MNPs from example 2 were dispersed in 20 mL dry THF under nitrogen atmosphere for 1 h using an ultrasonic bath. After that, the reaction flask was placed in an ice-bath at 0° C. under strong stirring. Triethylamine (0.2 mL, 2.75 mmol) and 2-bromo-2-methylpropionyl bromide (0.2 mL, 1.6 mmol) were added to the ice cooled dispersion. The reaction mixture was stirred for 18 h under nitrogen atmosphere.

The modified MNPs were separated by magnetic decantation, purified by washing and dried as was described in example 2. The amount of the product obtained was 0.9980 g and the reaction yield 81.45%. The reaction yield was calculated by dividing the amount of final product to the sum of amount of reagents used.

Table 2 shows the efficiency of recovery of the functionalized MNPs with ATPR initiator and the yield of the reaction.

TABLE 2

| Sample (code) | MNPs (batch) | Reaction yield (%) | Efficiency of MNPs recovery (%) | Sample amount after step 2 (g) |
|---|---|---|---|---|
| M-33-init. functionalization, step 2 | M-33 | 81.5 | 99.8 | 0.998 |
| M-32-init. functionalization, step 2 | M-32 | 65.6 | 94.3 | 0.800 |

The reaction was confirmed by the presence of relevant peaks in the FTIR spectra: 1633 cm−1, 1384 cm−1, 1210 cm−1, 1151 cm−1, 807 cm−1.

Example 4

ATRP Polymerization of NIPAM

The ATRP polymerization of NIPAM was initiated by a copper/Me6TREN catalyst system. A stock solution of catalyst was fresh prepared under nitrogen atmosphere. A mixture of CuBr (16 mg, 0.11 mmol), CuBr$_2$ (17 mg, 0.07 mmol) was flushed with nitrogen for 20 min. After that, Me6TREN (0.12 mL, 0.75 mmol) and 1 mL degassed water were added. The MNPs functionalized with ATRP initiator (0.8 g) from example 3 were dispersed in 30 mL degassed water. In a separate flask the NIPAM monomer (0.9052 g, 8 mmol) was dissolved in 5 mL degassed water. The monomer solution was added to the dispersed MNPs under air exclusion and the reaction flask was placed into an ice bath. The polymerization was started by addition of 40 μL catalyst solution to the reaction flask. The reaction time was 18 h. The polymerization was terminated by opening the reaction flask in order to expose the catalyst system to air.

The PNIPAM functionalized MNPs were magnetically separated, washed twice with distilled water and dried in a vacuum oven at 60° C. overnight. The magnetic decantation was repeated twice in order to ensure the quantitative separation of PNIPAM functionalized MNPs.

The amount of the product was 0.9095 g and the reaction yield 53.33%. The reaction yield was calculated by dividing the amount of final product to the sum of amount of reagents used.

Table 3 shows the PNIPAM functionalized MNPs and their analysis data.

TABLE 3

| Sample (code) | NIPAM concentration in feed (mmole/g MNP) | Reaction yield (%) | PNIPAM content on functionalized MNP from elemental analysis (mmole/g MNP) |
|---|---|---|---|
| M-33-R.1 | M-33 | 81.5 | 99.8 |
| M-33-R.2 | M-32 | 65.6 | 94.3 |
| M-33-R.3 | | | |
| M-33-R.4* | | | |

*The sample was prepared using the same protocol as the M-33-R.2 sample.

The successful linkage of the PNIPAM was confirmed by FTIR spectra, where the amide bands (C=O, 1636 cm−1 and NH, 1555 cm−1) were clearly visible.

Example 5

Stability of MNP-PNIPAM Based Water Dispersions

The stability of the water dispersions based on MNP-PNIPAM was evaluated at room temperature by visual observation at the time when the macroscopic phase separation took place. Two water dispersions based on functionalized M-33 nanoparticles with two different contents of PNIPAM (M-33-R.1 and M-33-R.2 samples) were prepared. Their stability was compared with that of the precursor sample (M-33 nanoparticles functionalized with ATRP initiator, M-33-Init.), (FIG. 2).

It was observed that the dispersion based on M-33-PNIPAM containing increased amount of PNIPAM linked to the MNP was stable for at least 1 h. Only a partially sedimentation was observed after 15 h and the sample was redispersable. Stability of water dispersions varied as follows:

$M$-33-Init.<$M$-33-$R$.1<$M$-33-$R$.2

In a similar way M-32-PNIPAM and M-32-Init. water dispersions were investigated (FIG. 3). It was observed that by dispersing M-32-PNIPAM in water, strong aggregates were formed. Moreover, after drying the sample did not redisperse. The length of the PNIPAM chains was roughly estimated from the amount of polymer linked to the MNP calculated from the elemental analysis data.

The functionalization of M-32 and M-33 nanoparticles started with surface modification. Initially a smaller amount of the polymer was used, which corresponds to shorter PNIPAM chains. Since a strong aggregation behavior was observed for M-32-PNIPAM, the further experiments were focused solely on functionalization of the M-33 nanoparticles. For the M-33 nanoparticles an increased amount of polymer was used, which corresponds to longer PNIPAM chains.

Example 6

Screening of LOST for MNP-PNIPAM

Screening of LOST was performed by visual observation of the macroscopic phase separation for aqueous dispersions of MNP-PNIPAM, c=0.68 wt-% as a function of the increase of the temperature (FIG. 5). This concentration was selected based on literature data related to similar functionalized MNP tested as a draw solution in the forward osmosis process.

Figure 4:
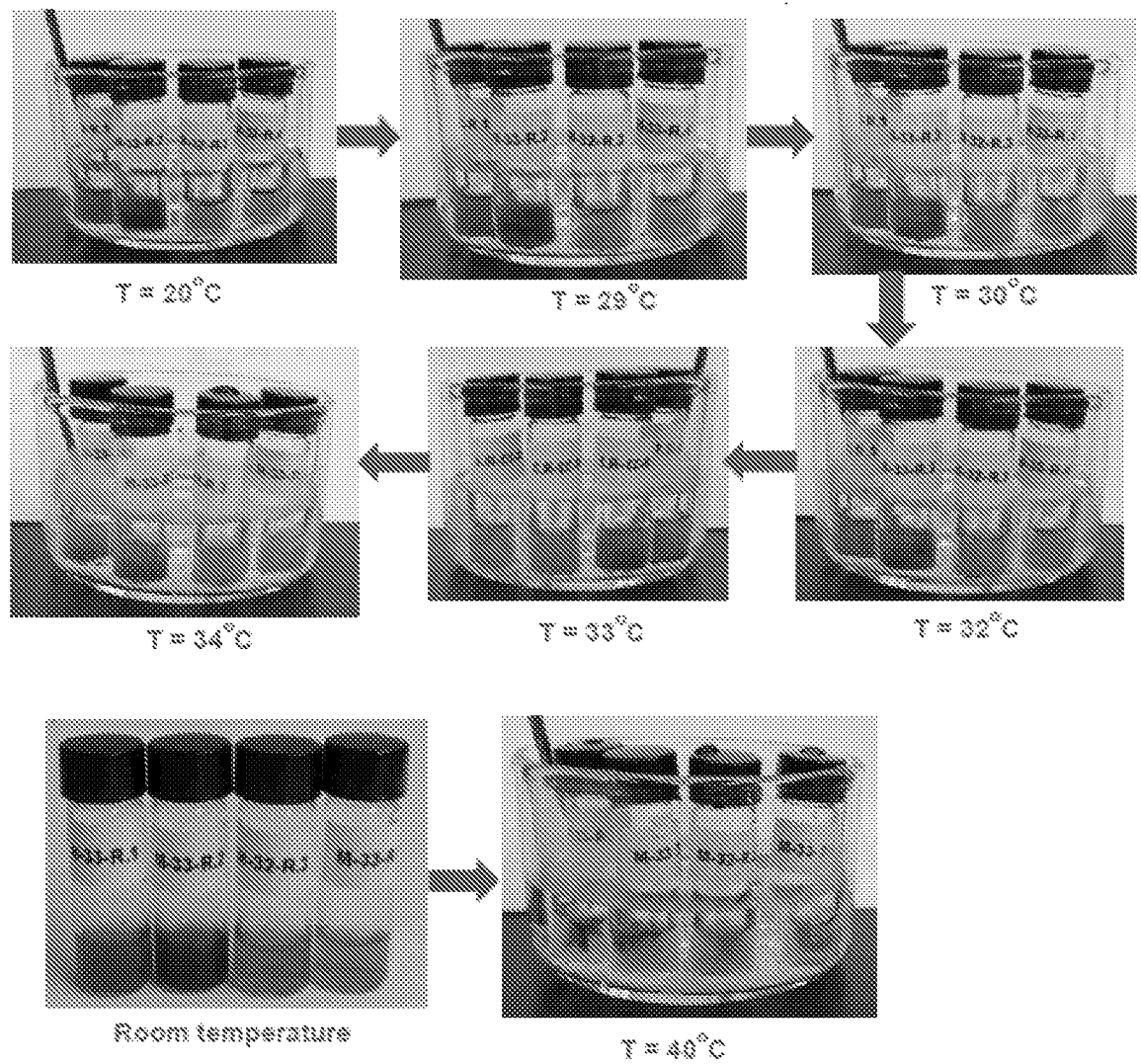
FIG. 4 shows screening results of the lower critical solution temperature (LOST) for poly (N-isopropylacrylamide) (PNIPAM) functionalized MNPs according to the present disclosure.

FIG. 4 depicts the LOST screening results. For all the samples a shrinking of PNIPAM linked to the MNP was observed as function of temperature between 30-33° C. At 40° C. MNP-PNIPAM samples precipitated out from the aqueous solutions.

Example 7

Osmotic Pressure Measurements for MNP-PNIPAM

The evaluation of the osmotic pressure was performed for the M-33-R.4 sample, as aqueous dispersion, c=0.68 wt-%. The sample was used for this test as aqueous dispersion without drying step after the purification. The tested sample contains 2 mmol PNIPAM/g MNP (1.8 mmol PNIPAM/g sample). The osmotic pressure generated by 10 µL M-33-R.4 dispersion ($0.1224 \times 10^{-3}$ mmol PNIPAM, 0.0138 mg PNIPAM, 12 mmol/kg polymer) was below 2.4 bar.

Osmotic pressure tests were performed for sample solutions (c=0.68 wt %). The measured osmotic pressure for sample M-32-R.3 was 0.6 bar. The sample was obtained after the $2^{nd}$ recovery by magnetic decantation of the polymer functionalized MNP and was redispersed in water for testing.

The invention claimed is:

1. A method for manufacturing a covalently functionalized coated magnetic nanoparticle, which includes forming a shell of a hydrophilic polymer coating layer on top of a magnetic metal core coated with a carbon coating, comprising the steps of
    (i) providing a particle comprising a magnetic metal core coated with a carbon coating, and
    (ii) subjecting the surface of the particle from step (i) to covalent functionalization by generating amino reactive groups on said surface via diazonium chemistry, and
    (iii) carrying out an irreversible attachment of an atom transfer radical polymerization (ATRP) initiator on the surface obtained from step (ii), and
    (iv) forming a hydrophilic polymer layer on the surface obtained from step (ii) by a surface initiated atom transfer radical polymerization (SI-ATRP) reaction with a monomer comprising N-isopropylacrylamide (NIPAM).

2. The method of claim 1, wherein the reactions of steps (ii)-(iv) take place in an aqueous solvent.

3. The method of claim 1, wherein the reaction temperatures at steps (ii)-(iv) are less than 30° C.

4. The method of claim 1, wherein the functionalization includes use of an amine.

5. The method of claim 4, wherein the amine is 4-aminophenylamine.

6. The method of claim 1, wherein the magnetic metal core is selected from cobalt, iron or nickel.

7. The method of claim 1, wherein the initiator is selected from 2-bromo-2-methylpropionyl bromide, 2-bromobutyrate, ethyl 2-bromopropionate or 2-chloropropionyl chloride.

* * * * *